(12) United States Patent
Alouani et al.

(10) Patent No.: US 10,770,918 B2
(45) Date of Patent: Sep. 8, 2020

(54) APPARATUS, SYSTEM, AND METHOD FOR INTEGRATED REAL TIME LOW-COST AUTOMATIC LOAD DISAGGREGATION, REMOTE MONITORING, AND CONTROL

(71) Applicant: Tennessee Technological University Foundation, Cookeville, TN (US)

(72) Inventors: Ali Alouani, Cookevile, TN (US); Brandon England, Cookeville, TN (US)

(73) Assignee: Tennessee Technological University Foundation, Cookeville, TN (US)

( * ) Notice: Subject to any disclaimer, the term of this patent is extended or adjusted under 35 U.S.C. 154(b) by 14 days.

(21) Appl. No.: 15/827,036

(22) Filed: Nov. 30, 2017

(65) Prior Publication Data

US 2019/0027961 A1 Jan. 24, 2019

Related U.S. Application Data

(60) Provisional application No. 62/534,837, filed on Jul. 20, 2017.

(51) Int. Cl.
*G05D 11/00* (2006.01)
*H02J 13/00* (2006.01)
(Continued)

(52) U.S. Cl.
CPC ........ *H02J 13/0006* (2013.01); *G05B 19/048* (2013.01); *H02J 3/32* (2013.01); *H02J 13/00* (2013.01); *G05B 2219/2639* (2013.01)

(58) Field of Classification Search
CPC .......... H02J 13/0006; H02J 13/00; H02J 3/32; G05B 19/048; G05B 2219/2639
See application file for complete search history.

(56) References Cited

U.S. PATENT DOCUMENTS 4,404,472 A 9/1983 Steigerwald
4,525,633 A 6/1985 Wertheim et al.
(Continued)

OTHER PUBLICATIONS

MIT Laboratory for Information & Decision Systems: "Power Disaggregation," available at lids.mit.edu/research/research-highlights/power-disaggregation (as archived by the Internet Archive: Wayback Machine at Archive.org on Sep. 10, 2015), pp. 1-4.
(Continued)

*Primary Examiner* — Mohammad Ali
*Assistant Examiner* — Sheela Rao
(74) *Attorney, Agent, or Firm* — Patterson Intellectual Property Law, P.C.; Edward D. Lanquist, Jr.; Grant M. Ford

(57) ABSTRACT

Apparatuses, systems, and methods for providing load disaggregation, remote monitoring, and controlling a plurality of loads are provided. The apparatus may include a universal embedded metering and control system (UEMCS) and a universal storage and renewable energy interface (USREI). The UEMCS may include a main device engine, a communication module coupled to the main device engine, a multiplexer coupled to the main device engine, a plurality of current sensors coupled to the multiplexer, and at least one voltage sensor coupled to the main device engine. The USREI may be coupleable to at least one of the plurality of current sensors, coupled to at least one renewable energy source, and configured to provide energy output by the at least one renewable energy source to the UEMCS for output to at least one of the plurality of loads.

13 Claims, 14 Drawing Sheets

(51) Int. Cl.
*G05B 19/048* (2006.01)
*H02J 3/32* (2006.01)

(56) References Cited

U.S. PATENT DOCUMENTS

| | | | |
|---|---|---|---|
| 4,649,334 | A | 3/1987 | Nakajima |
| 5,327,071 | A | 7/1994 | Frederick et al. |
| 5,869,956 | A | 2/1999 | Nagao et al. |
| 6,046,919 | A | 4/2000 | Madenokouji et al. |
| 6,255,804 | B1 | 7/2001 | Herniter et al. |
| 6,281,485 | B1 | 8/2001 | Siri |
| 6,433,522 | B1 | 8/2002 | Siri |
| 7,042,195 | B2 | 5/2006 | Tsunetsugu et al. |
| 7,158,395 | B2 | 1/2007 | Deng et al. |
| 7,193,872 | B2 | 3/2007 | Siri |
| 7,371,963 | B2 | 5/2008 | Suenaga et al. |
| 7,844,370 | B2 * | 11/2010 | Pollack .......... B60L 53/57 700/291 |
| 8,606,419 | B2 | 12/2013 | Besore et al. |
| 8,949,051 | B2 | 2/2015 | Burke et al. |
| 8,983,670 | B2 | 3/2015 | Shetty et al. |
| 2010/0236612 | A1 | 9/2010 | Khajehoddin et al. |
| 2011/0202194 | A1 | 8/2011 | Kobraei et al. |
| 2011/0282504 | A1 | 11/2011 | Besore et al. |
| 2014/0018969 | A1 | 1/2014 | Forbes, Jr. |
| 2016/0211742 | A1 * | 7/2016 | Mohammad .......... H02J 50/00 |
| 2016/0226760 | A1 * | 8/2016 | Liljenstolpe .......... H04L 45/74 |
| 2017/0104331 | A1 * | 4/2017 | Thornton .......... H02J 4/00 |

OTHER PUBLICATIONS

St. John, Jeff: "Putting Energy Disaggregation to the Test: Cost, accuracy linked for tech that spits whole home energy into discrete loads," Nov. 18, 2013, GreenTech Media, available at www.greentechmedia.com/articles/read/putting-energy-disaggregation-tech-to-the-test (last accessed May 8, 2018), pp. 1-9.

Mohassel, R.R., et al., "A Survey of Advanced Metering Infrastructure," Journal of Electric Power and Energy System 63, 2014, pp. 473-484.

Alhakoon, D., et al., "Smart Electricity Meter Data Intelligence for Future Energy Systems: A Survey," IEEE Transactions on Industrial Informatics, Feb. 2016, vol. 12, No. 1, pp. 425-436.

Lorek, M., et al., "COTS-Based Stick-On Electricity Meters for Building Submetering," IEEE Sensors Journal, Oct. 2014, vol. 14, No. 10, pp. 3482-3489.

* cited by examiner even though this approach does not require a separate meter to have the ability to remotely control individually-targeted residential, commercial, and industrial loads in real time. To make it attractive to utility companies, the upfront infrastructure cost should be minimal. Automatic intelligent adaptive load control strategies are needed to optimize the local load consumption and help maintain the stability of the grid by prioritizing the loads to be turned OFF during peak load or injecting local energy, such as the one from an electric car battery or renewable energy sources, into the grid.

APPARATUS, SYSTEM, AND METHOD FOR INTEGRATED REAL TIME LOW-COST AUTOMATIC LOAD DISAGGREGATION, REMOTE MONITORING, AND CONTROL

CROSS-REFERENCES TO RELATED APPLICATIONS

This application claims benefit of U.S. Provisional Patent Application No. 62/534,837, dated Jul. 20, 2017, entitled "Apparatus and Method for Integrated Real Time Low-cost Automatic Load Disaggregation, Remote Monitoring, and Control," and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to apparatuses, systems, and methods for integrated real time low-cost automatic load disaggregation, remote monitoring, and control.

At the consumer level, the conventional practice of power metering is typically manually recorded. Furthermore, the consumer only gets an electric bill with no details about which load consumes which parts of the aggregate power consumption. This is true in homes, apartment complexes, commercial, and industrial buildings. Measuring the power consumption of individual major loads may be used as a diagnosis tool when the appliance/device starts to malfunction. Finally knowing the energy consumption of individual loads such a Heating, Ventilation, and Air Conditioning (HVAC) unit may alter the customer behavior to automatically reduce energy consumption by performing remote local control of such loads using appropriate automatic intelligent control schemes. To locally control a particular load, such load needs to be equipped with an affordable remote control infrastructure.

Smart meters have been in existence since the early 2000's as an attempt to automate the process, among other applications. Beside their high cost, they suffer from the specificity of the protocols used to acquire, transmit, and store data in real time. The lack of universality and high cost of smart meters make them less attractive to consumers. Furthermore, existing smart meters do not integrate the functions of monitoring and remote intelligent control in order to perform adaptive local load control to show the potential impact load management. Some of the existing smart meters are limited to switching the local load ON/OFF based on preconfigured off line thresholds.

At the utility level, in order to reduce the peak load, utility companies may provide economic incentive to the consumer to have the ability to remotely control individually-targeted residential, commercial, and industrial loads in real time. To make it attractive to utility companies, the upfront infrastructure cost should be minimal. Automatic intelligent adaptive load control strategies are needed to optimize the local load consumption and help maintain the stability of the grid by prioritizing the loads to be turned OFF during peak load or injecting local energy, such as the one from an electric car battery or renewable energy sources, into the grid.

In either customer or utility levels, for the purpose of load control/management, the concept of load disaggregation emerged to identify the consumption of targeted loads, such as HVAC. For load disaggregation, basically two approaches have been considered: Hardware- and software-based approaches. In hardware-based solutions, the simplest idea is to use a power meter for each load. This approach provides accurate measurement of the individual load consumption. However, it is prohibitively expensive, as it requires a separate meter for each appliance.

In an attempt to reduce the hardware used for load sub-metering, the concept of wireless sensors connected to a hub to measure individual load consumption was used. Even though this approach does not require a separate meter for individual loads, the use of wireless sensors is expensive and may pose interference problems as the number of nearby wireless sensors increases. Furthermore, special communication protocols have to be used to acquire the load data. Similar problems exist with wired networks, as both have added overhead in terms of communications and an increased number of processing units. Finally, this approach does not integrate the load disaggregation and load control functions.

In software-based sub-metering, the main idea is to use the aggregate load consumption and estimate the power consumption of targeted appliances/loads. This approach uses the aggregate load to extract individual loads. It uses advanced signal processing and matching techniques. This approach is inexpensive. However, it is inaccurate.

The inclusion of renewable energy generation is becoming more common as we move forward. Not only are large, special-purpose generation farms becoming more prevalent, but so also are smaller installations commonly seen both commercially and residentially. Small-scale installations are typically solar-based, but wind sources are sometimes used as well. One of the important aspects relating to renewable energy is the desire to use all that is available. Known as Maximum Power Point Tracking (MPPT), this goal has been extensively studied and is the primary focus of many patents and patent application publications, with U.S. Pat. Nos. 6,433,522, 7,371,963, 4,404,472, 4,649,334, 6,281,485, 6,281,485, 5,327,071, 4,525,633, 7,193,872, 7,158,395, 6,255,804, 5,869,956, 6,046,919, US20100236612, and U.S. Pat. No. 7,042,195 being just a few of the many. While using MPPT strategies allow maximizing the utility of renewable resources, there are times when the sources must operate below their maximum to meet grid requirements. Further, much of the work involved involves the use of DC-to-DC converters to enable MPPT ability. Similar to what is covered under U.S. Pat. No. 7,371,963, the DC-to-DC converters can also allow many renewable sources running at different voltages to share a single set of common busses.

Like renewable energy, electric vehicles have been increasing in popularity. Each electric vehicle must have large battery banks to allow it to travel even relatively short distances. While many only focus on charging their vehicles, this large amount of stored energy has great potential for helping the grid. This is again a popular research topic that also has a large number of patents and patent application publications describing it, including US2011/0202418, US2013/0179061, US2007/0282495, U.S. Pat. Nos. 7,844,370, 7,747,739, and US2012/0109798. These examples cover different ways to better utilize electric vehicles by allowing the vehicles to charge when it is best for the grid and to provide power back to the grid when it is best, such as during peak hours. Some of the research also delves into working with aggregating the vehicles for easier control, as is covered in U.S. Pat. Nos. 7,844,370, 7,747,739. The system in US2010/0274656 works with managing the charging of multiple electric vehicles, working to verify that a vehicle is legitimate and that the energy taken is properly paid for.

BRIEF SUMMARY OF THE INVENTION

It is thus desirable to provide load disaggregation, monitoring and control of major individual loads in residential, commercial, and manufacturing facilities.

One object of the systems and methods disclosed herein is to provide an apparatus for providing load disaggregation, remote monitoring, and controlling a plurality of loads. The apparatus includes a universal embedded metering and control system (UEMCS) and a universal storage and renewable energy interface (USREI). The UEMCS includes a main device engine, a communication module coupled to the main device engine, a multiplexer coupled to the main device engine, a plurality of current sensors coupled to the multiplexer, and at least one voltage sensor coupled to the main device engine. The USREI is coupled to at least one of the plurality of current sensors and is coupleable to at least one renewable energy source. The USREI is configured to provide energy output by the at least one renewable energy source to the UEMCS for output to at least one of the plurality of loads.

Each of the plurality of current sensors may be configured to correspond to a particular load of a plurality of loads coupled to the apparatus. The UEMCS may be configured to receive operation information from the plurality of current sensors and from the at least one voltage sensor, and to perform a load control operation by the main device engine based on the received operation information.

The main device engine may compare a measured energy output of at least one renewable energy source to a power set point and to perform a renewable energy source operation according to the comparison. The renewable energy source operation may include at least one of increasing or decreasing energy output by the at least one renewable energy source. The renewable energy source operation may include publishing a renewable energy source deficiency notification.

The communication module may communicate with a device external to the UEMCS and to receive at least one set of firmware data from the device external to the UEMCS. The at least one set of firmware data may contain firmware update data associated with at least one of the main device engine and the communication module, and the at least a portion of the at least one set of firmware data may contain an updated or downgraded firmware.

The main device engine may cause at least a portion of energy generated by the at least one renewable energy source to be transmitted to a power grid coupled to the apparatus.

Another aspect of the systems and methods disclosed herein relates to a power distribution apparatus. The power distribution apparatus includes a conductive bus coupleable to a power grid, a power meter and control device coupled to the conductive bus, a voltage sensor coupled between the conductive bus and the power meter and control device, a plurality of current sensors coupled to the conductive bus, at least one universal control and safety module coupled to at least one of the plurality of current sensors and coupleable to a load of the power distribution apparatus, and a universal storage and renewable energy interface coupled to at least one of the plurality of current sensors and further connected to at least one renewable energy source.

The power distribution apparatus may be coupleable to an existing power distribution panel. The power distribution apparatus may include a breaker processing engine configured to receive a control signal and to perform at least one circuit breaking operation responsive to the control signal. The power distribution apparatus may operate as a replacement to an existing power distribution panel.

A further aspect of the present invention relates to a method for providing load disaggregation, remote monitoring, and controlling a plurality of loads in a system coupled to at least one renewable energy source and a power grid. The method begins by obtaining a current maximum power value associated with a plurality of loads coupled to the system and state of charge information relating to at least one power storage device. A power set point for the power grid is determined and one or more power values associated with at least one of the plurality of loads and the at least one power storage device are set. It is then determined whether excess power is currently being received from the at least one renewable energy source. A power output level of the at least one renewable energy source is adjusted when it is determined that excess power is currently being received from the at least one renewable energy source.

A state of charge value of the at least one power storage device is compared to a predetermined threshold after determining that excess power is currently being received from the at least one renewable energy source. Charging power is selectively provided to the at least one power storage device when the state of charge value is below a predetermined threshold.

It may be determined whether insufficient power is currently being received from the at least one renewable energy source. Power may be selectively transmitted from the at least one power storage device when it is determined that insufficient power is currently being received from the at least one renewable energy source. The selectively transmitting power from the at least one power storage device may include first obtaining a current state of charge value of the at least one power storage device, and transmitting power from the at least one power storage device when the current state of charge value exceeds a predetermined threshold.

At least a portion of the excess power may be provided to the power grid when it is determined that excess power is currently being received from the at least one renewable energy source.

At least a portion of power stored by the at least one power storage device may be selectively provided to the power grid.

A list of rules may be sorted according to a rule priority associated with each rule of the list of rules. At least one of the rules may relate to at least one of providing load disaggregation, remote monitoring, or controlling a plurality of loads. A current rule of the sorted list of rules may be selected, and it may be determined whether a condition associated with the current rule is satisfied. It may be selectively determined whether action associated with the current rule may be performed without violating a higher priority rule of the list of rules. It may be selectively determined whether a partial action may be taken when it is determined that the action associated with the current rule may not be performed without violating the higher priority rule. At least one of the action associated with the current rule or the partial action may be selectively performed. A next rule of the sorted list of rules may be selected for determining whether a condition associated with the next rule is satisfied.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
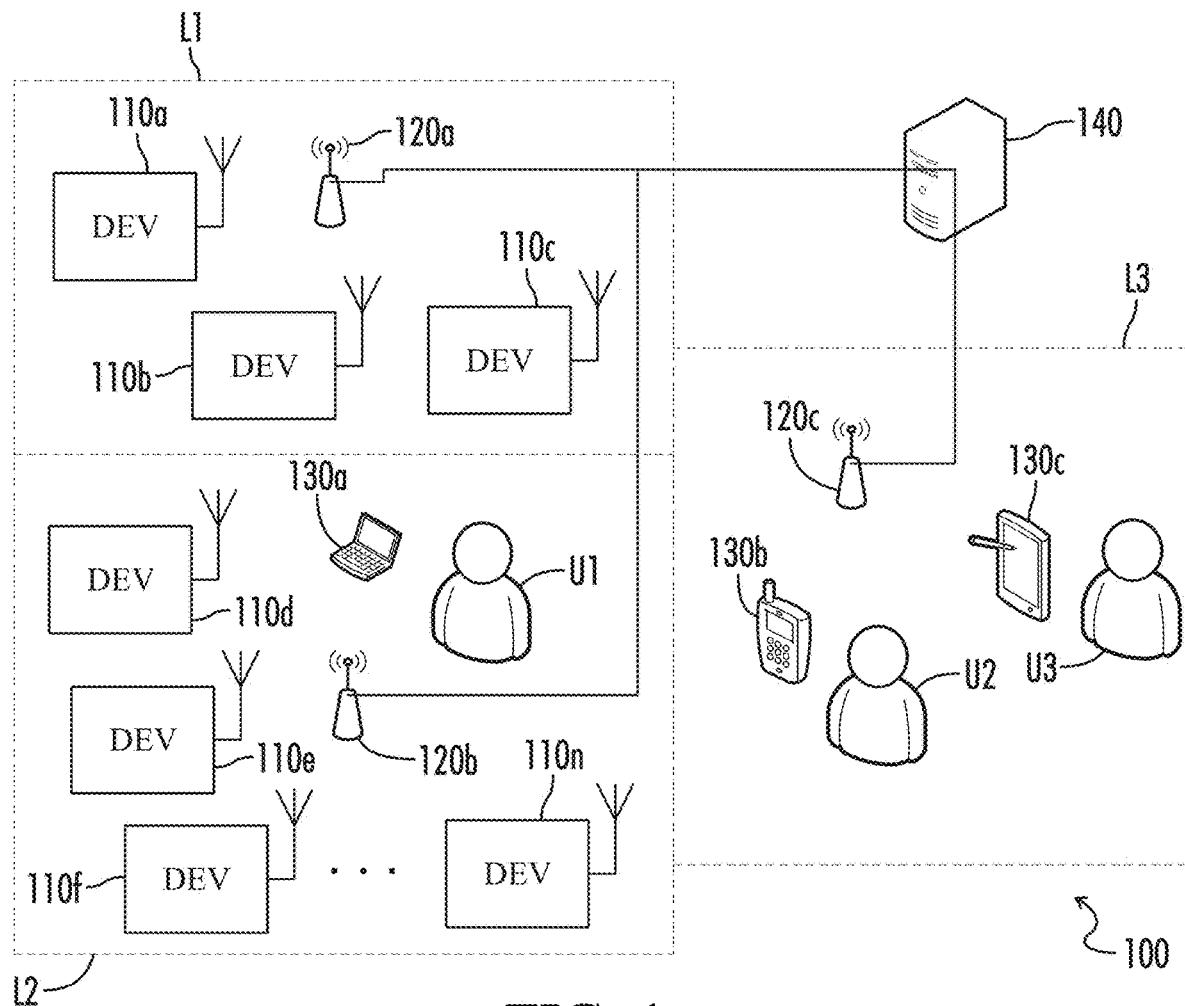
FIG. 1 illustrates a system for providing integrated load disaggregation, monitoring, and control according to aspects of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-14, exemplary apparatuses, systems, and methods for integrated real time low-cost automatic load disaggregation, remote monitoring, and control are now illustrated in greater detail. Where the various figures may describe embodiments sharing various common elements and features with other embodiments, similar elements and features are given the same reference numerals and redundant description thereof may be omitted below.

A first aspect of the present disclosure provides a low cost and accurate solution to load disaggregation and remote storage. A second aspect of the present disclosure performs local/remote load monitoring and storage. A third aspect of the present disclosure provides a new electronic relay to be for automatic local and remote load control strategies.

In implementations consistent with the present disclosure, load control does not consist only of turning a load ON and OFF, but instead can use local compensation of the load without interference from a utility. Implementations consistent with the present disclosure may also use available renewable resources to unload the grid and/or to help the grid during peak load by injecting available renewable energy or nonrenewable energy, such as electric vehicle battery energy, into the grid.

An integrated load disaggregation, monitoring, and control (ILDMC) device may be used by any residential, commercial, and industrial consumer. An ILDMC device may also be used by utility companies for the purpose of peak load reduction.

An ILDMC device may be equipped with an array of hard-wired sensors from at least one of a distribution box, a single power meter, a single wireless communication module, and an array of embedded electronic control and safety modules. Only the hardware of a single power meter may be needed thanks to the use of the concept of multiplexing, where the power consumption of an array of individual loads can be measured by the single power meter hardware.

For existing customers, one or more embedded electronic control and safety modules may be placed in series with existing breakers to provide the needed control infrastructure at a low cost. For new installations, the one or more embedded electronic control and safety modules may be used for safety purposes as well as for the main control infrastructure. The design of a new power distribution box that integrates with an existing power distribution with the device is also provided.

An ILDMC device may use commonly-known protocols and available network infrastructure to acquire, transmit, process, and store load data in real time in various embodiments. Besides its universality, the use of the ILDMC device may require little or no investment in the network infrastructure.

An ILDMC device may be equipped with processing capabilities allowing it to implement an integrated solution for load disaggregation, monitoring, and intelligent remote local and distributed control strategies.

An ILDMC device may use techniques to allow an indeterminate number of loads to be controlled. An ILDMC device may perform local/distributed load compensation using capacitor and/or inductor banks that can be automatically added/removed. Such compensators may be placed at the consumer site, and/or at any point of choosing of the power utility. Furthermore, available local renewable energy sources, such as an electric vehicle battery, can be used to automatically unload the grid during peak load demand.

In terms of compensation, multiple devices in a local area can cooperate. If an area is known to need a certain amount of compensation, this amount can be reported to a central server configured to host all of a sensor's data, which can help coordinate multiple devices to simultaneously add compensation. They can also provide added compensation at staggered intervals to reduce the transients felt.

A control strategy may be priority based. In one exemplary embodiment, a customer's wishes may take precedence over a utility's goals while attempting to meet the utility goals as the second priority, or vice-versa.

The universal embedded electronic controller and safety module (UEECSM) may be used to replace both a traditional breaker and to add the infrastructure for universal power control applications. That is, the UEECSM is not only limited to turning ON/OFF loads, it can be used to implement advanced control strategies, such as optimizing energy consumption and effectively transferring energy from the consumer to the grid. This is typically the case when the consumer generates renewable energy and/or has an electric vehicle whose battery can be used to help stabilize the local grid. Finally, the same control infrastructure can be used to charge batteries from renewable energy as well as from a power utility in the proper time.

Control of renewable sources and storage devices is accomplished using a universal storage and renewable energy interface (USREI). The USREI may connect multiple renewable resources, storage devices and the grid using a common direct current (DC) voltage link and may allow for power to flow between them based on the output of the UEECSM. This may allow for optimal control of power output and even the ability to trade off efficiency for reactive power production/consumption.

An integrated load disaggregation, monitoring, and control (ILDMC) device 110 is an internet-enabled wirelessly-networkable device designed to connect to a server 140. FIG. 1 illustrates a system 100 including multiple devices 110a, 110b, . . . , 110n coupled to one or more transceivers 120 (e.g., transceiver 120a, 120b, and/or 120c, which may also be referred to as routers 120a, 120b, and/or 120c) which are located at multiple different locations (e.g., locations L1, L2, and L3) and coupled to a single server 140. The server 140 allows users (e.g., users U1, U2, and U3 via a user electronic device 130a, 130b, or 130c) to see their current power usage, to configure privacy settings, and to set control rules. The users U1, U2, and U3 are associated with at least one location. For example, the user U1 is associated with location L2, and the users U2 and U3 are associated with the location L3. The server 140 also houses the main portion of a control engine configured to perform calculating and issuing control actions. The control engine of the server 140 allows the control objectives of multiple devices 130 to be synchronized, enabling many of the abilities of the system as a whole.

Figure 2:
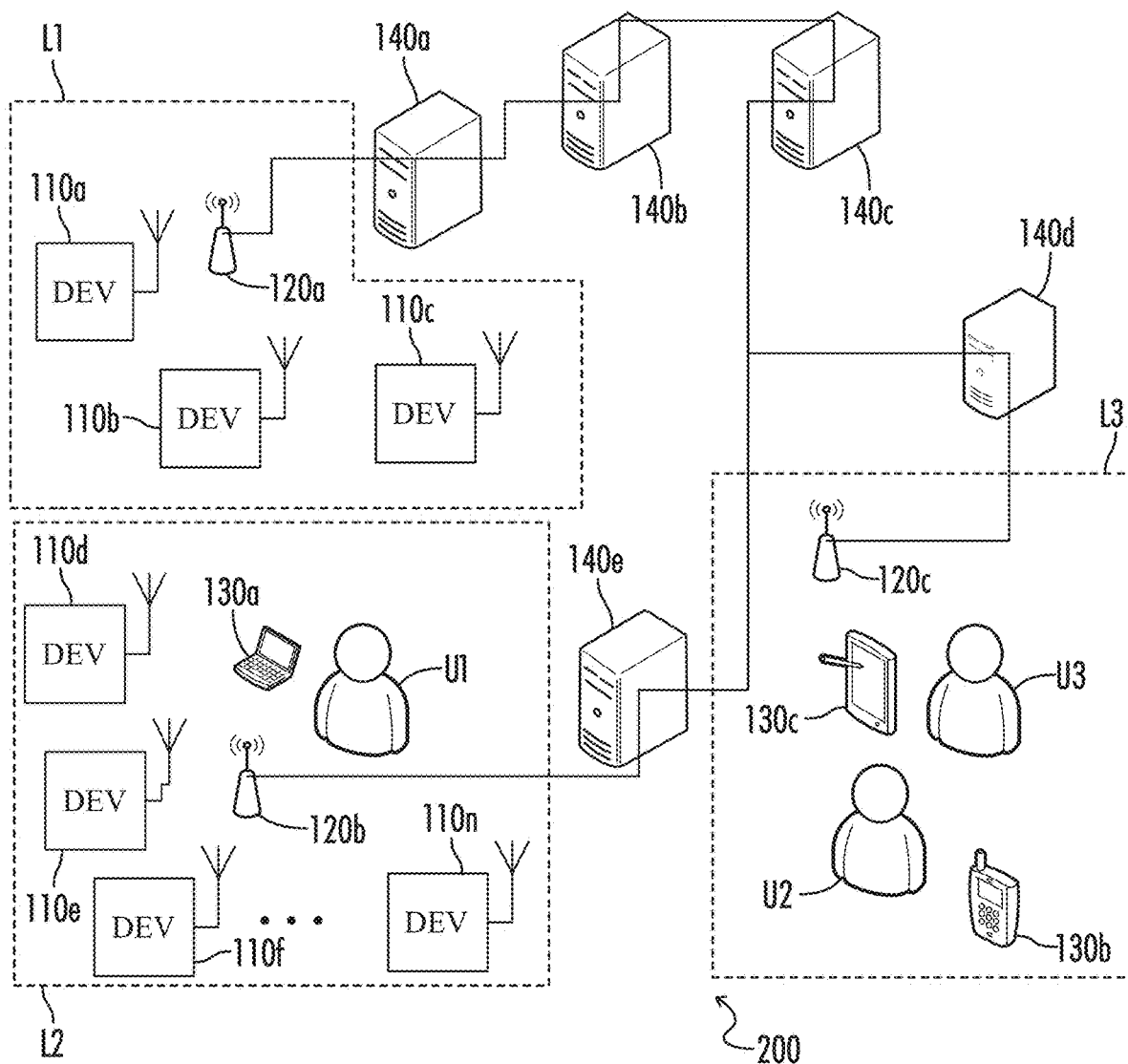
FIG. 2 illustrates a more complex variant for a system for providing integrated load disaggregation, monitoring, and control according to aspects of the present disclosure.

FIG. 2 illustrates a more complex setup of an alternative system 200 of the system 100 of FIG. 1, where multiple servers 140 exist (i.e., servers 140a, 140b, 140c, 140d, and 140e). In this case, the servers 140 can share data amongst each other as well as get data from other sources. One or more servers 140 may be included within or otherwise associated with a particular location (e.g., location L1, L2, and/or L3). In the embodiment illustrated in FIG. 2, the server 140a may be included within or associated with the location L1, the server 140e may be included within or associated the location L2, and the server 140d may be included within or associated with the location L3. The organization and operation of the devices 110, transceivers 120, user electronic devices 130, and the users U1-U3 may be otherwise unchanged from the system 100 of FIG. 1.

One example application of a system 200 is a utility smart grid, where a server 140 of a utility can obtain aggregate measurements from local servers 140 (e.g., servers 140a, 140d and 140e) and update them with current pricing as well as goal information. In this example, each local server 140 services multiple devices 110 and connects to the utility's server (e.g., 140b and/or 140c). This can be expanded further by having multiple utilities cooperate, allowing their servers to be interconnected as well.

Figure 3:
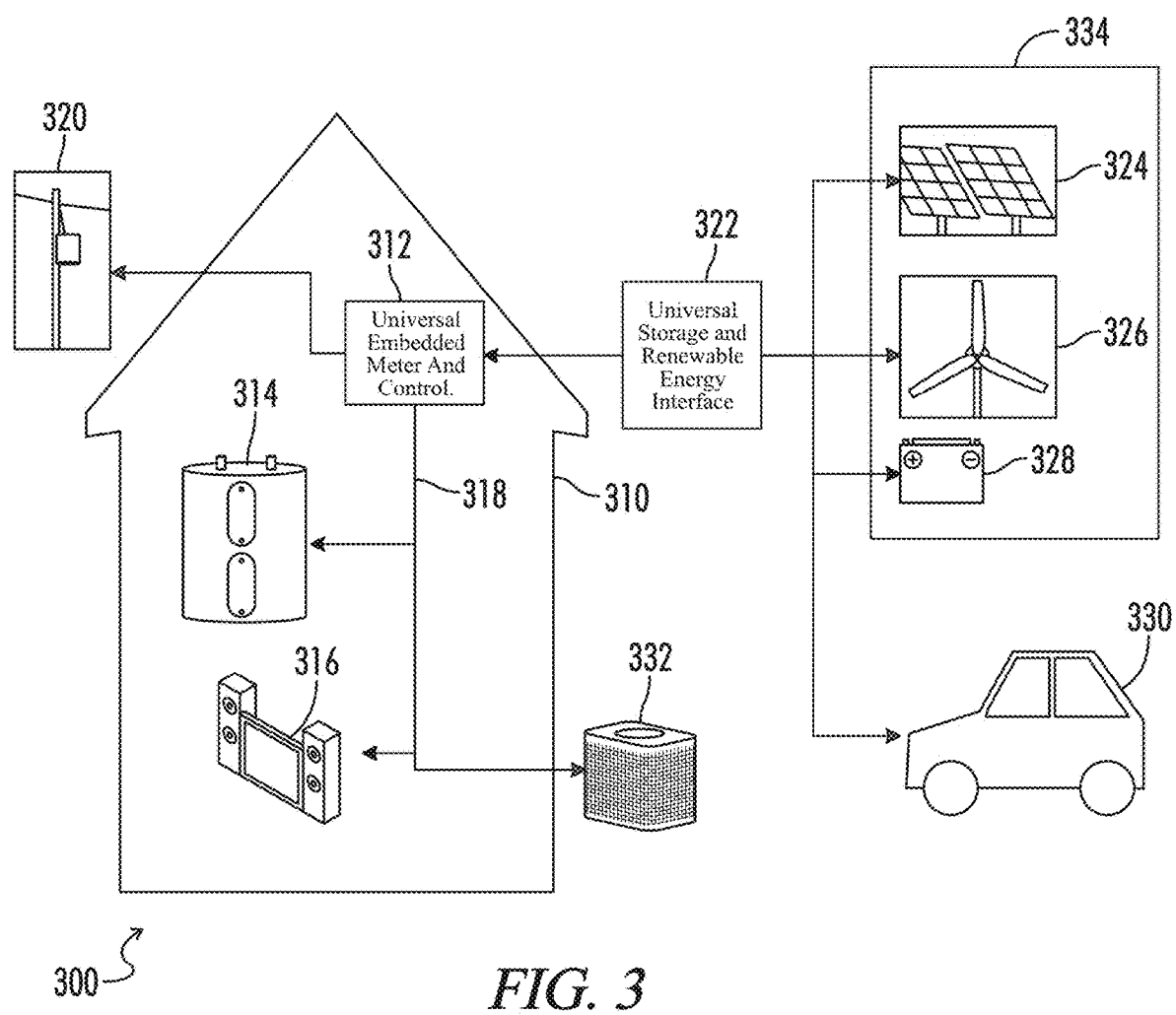
FIG. 3 illustrates a system including an exemplary embodiment of a household having multiple loads according to aspects of the present disclosure.

According to aspects of the present disclosure, an ILDMC device may be a metering and control system configured to work with both standard loads as well as renewable sources and storage systems, including electric vehicles. FIG. 3 illustrates such a system 300 including an example household 310 that has multiple loads including water heater(s) 314, central HVAC 332, and entertainment system(s) 316. On top of this, the household 310 may include a renewable energy system 334 that includes at least one of a solar array 324, a wind turbine 326, and/or a local battery 328 to help with power fluctuations. In the embodiment illustrated in FIG. 3, a user associated with the household 310 may drive an electric vehicle 330. Here, a device 110 implemented in conjunction with a universal embedded meter and controller 312 is capable of managing the entire household 310, including the renewable and storage resources which is accomplished using a Universal Storage and Renewable Energy Interface (USREI) 322. Two or more components of the system 300 may be coupled to at least one bus 318.

A device 110 may include two systems, a Universal Embedded Metering and Control System (UEMCS) 312 and the USREI 322. The UEMCS 312 may be coupled to a grid connection source 320. A metering and control interface associated with the UEMCS 312 can either be installed as a new distribution panel (e.g., for new installations) or added to an existing installation. In the case of an existing installation, one or more new components (e.g., current sensors, voltage sensors, and control modules) may be added near the existing distribution panel to lower cost. In some cases, one or more current sensors may be added inside an existing distribution panel.

Figure 4:
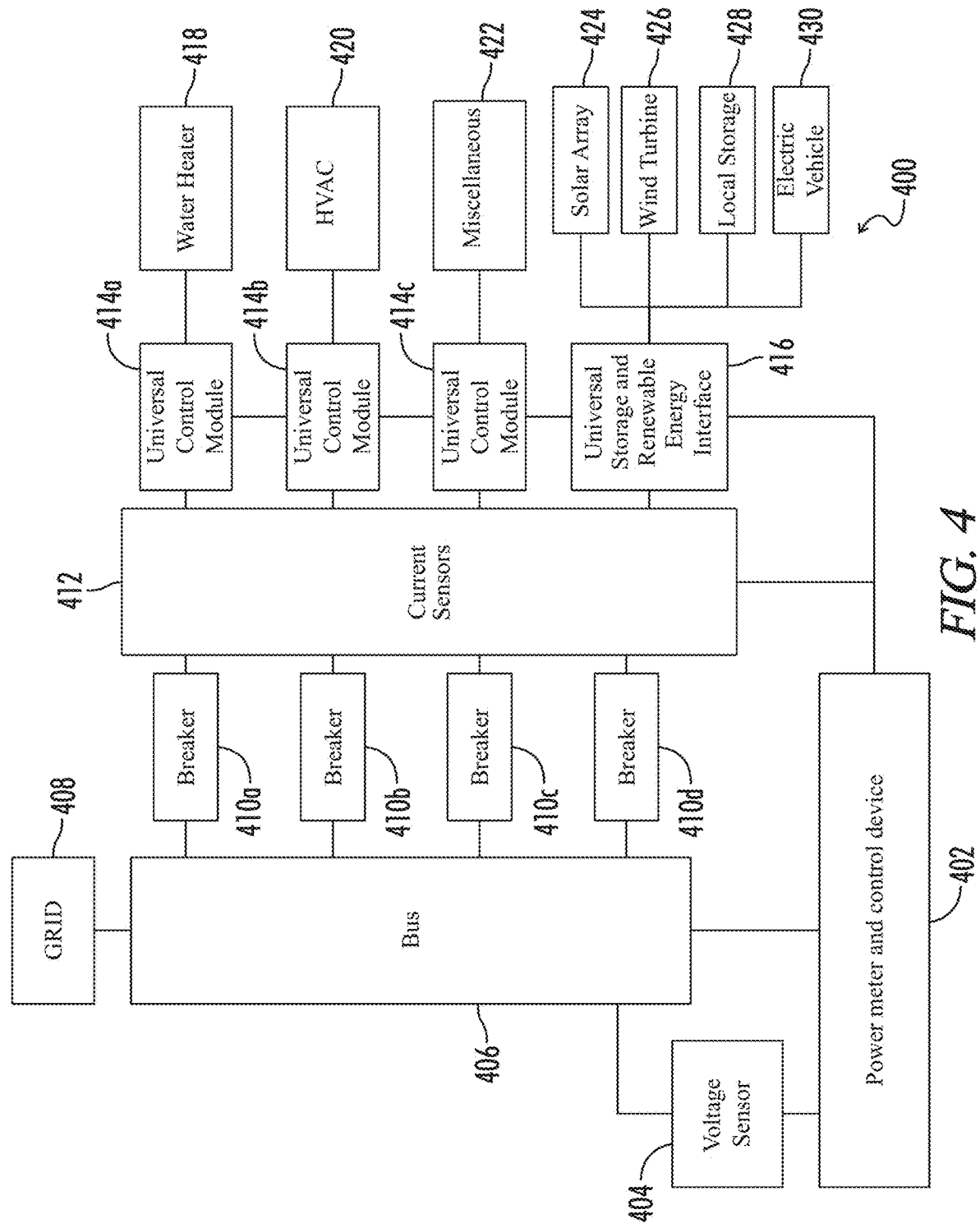
FIG. 4 illustrates a functional block diagram depicting a plurality of components of an exemplary installation into an existing system according to aspects of the present disclosure.

FIG. 4 illustrates a functional block diagram depicting a plurality of components of an exemplary installation into an existing system, according to aspects of the present disclosure. This system 400 includes a plurality of pre-existing breakers 410a-410d connected to at least one main bus 406, along with at least one added current sensors 412 and at least one control module 414a-414c. The at least one main bus 406 may be coupled to a grid 408, for example an electrical grid associated with a utility. A power meter and control device 402 may include or otherwise perform at least one operation corresponding to a universal embedded meter and controller 312, as described above. The power meter and control device 402 may be coupled to one or more of the at least one main bus 406 and/or to a voltage sensor 404 which is further coupled to the at least one main bus 406.

The plurality of pre-existing breakers 410a-410d may be coupled between the at least one main bus 406 and the current sensors 412. The current sensors 412 may be coupled to one or more of the universal control modules 414a-414c. The current sensors 412 may be further connected to a USREI 416 (e.g., configured and operable in the same manner as described herein with reference to the USREI 322) and the power meter and control device 402. One or more of the universal control modules 414a-414c may be coupled to one or more appliances, such as a water heater 418, an HVAC 420, a miscellaneous appliance 422, or any other appliance. The USREI 416 may be coupled to at least one renewable energy source, including at least one of a solar array 424, a wind turbine 426, a local storage 428, an electric vehicle 430, or any other renewable energy source.

Figure 5:
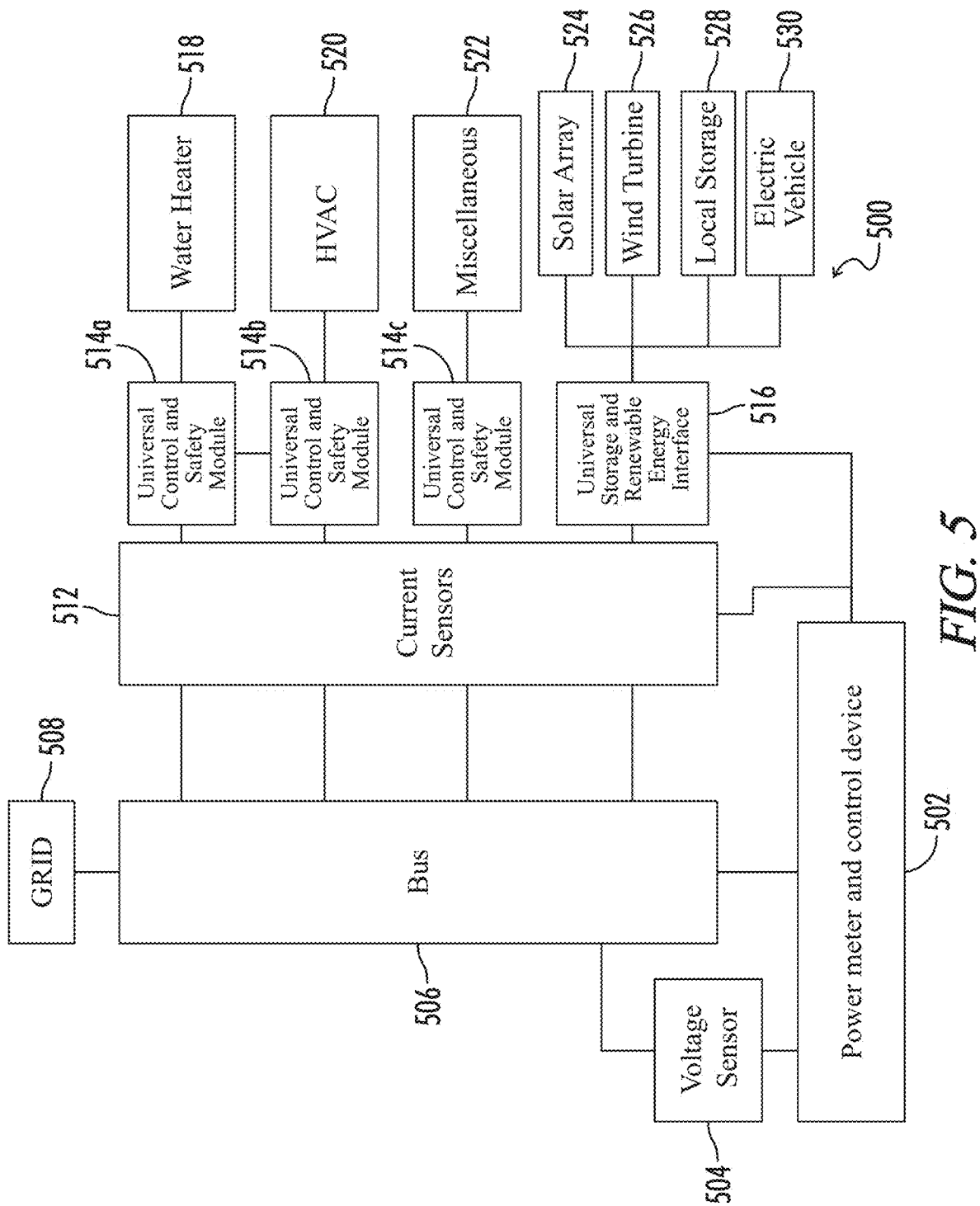
FIG. 5 illustrates a functional block diagram of an exemplary system of the components of a new installation according to aspects of the present disclosure.

FIG. 5 illustrates a functional block diagram of an exemplary system 500 of the components of a new installation, according to aspects of the present disclosure. Breakers 410 are no longer needed in the embodiment illustrated in FIG. 5, as the Universal Control and Safety Module has the ability to act both as a safety system, cutting power when a fault is detected, as well as a control system controlling the load as desired.

This system 500 includes at least one main bus 506 coupled to at least one current sensor 512 and at least one universal control and safety module 514a-514c. The at least one main bus 506 may be coupled to a grid 508, for example an electrical grid associated with a utility. A power meter and control device 502 may include or otherwise perform at least one operation corresponding to a universal embedded meter and controller 312. The power meter and control device 502 may be coupled to one or more of the at least one main bus 506 and/or to a voltage sensor 504 which is further coupled to the at least one main bus 506.

The at least one current sensor 512 may be coupled to one or more of the universal control modules 514a-514c. The at least one current sensor 512 may be further connected to a USREI 516 (e.g., configured and operable in the same manner as described herein with reference to the USREI 322) and to the power meter and control device 502. One or more of the universal control and safety modules 514a-514c may be coupled to one or more appliances, such as a water heater 518, an HVAC 520, a miscellaneous appliance 522, or any other appliance. The USREI 516 may be coupled to at least one renewable energy source, including at least one of a solar array 524, a wind turbine 526, a local storage 528, an electric vehicle 530, or any other renewable energy source.

Figure 6:
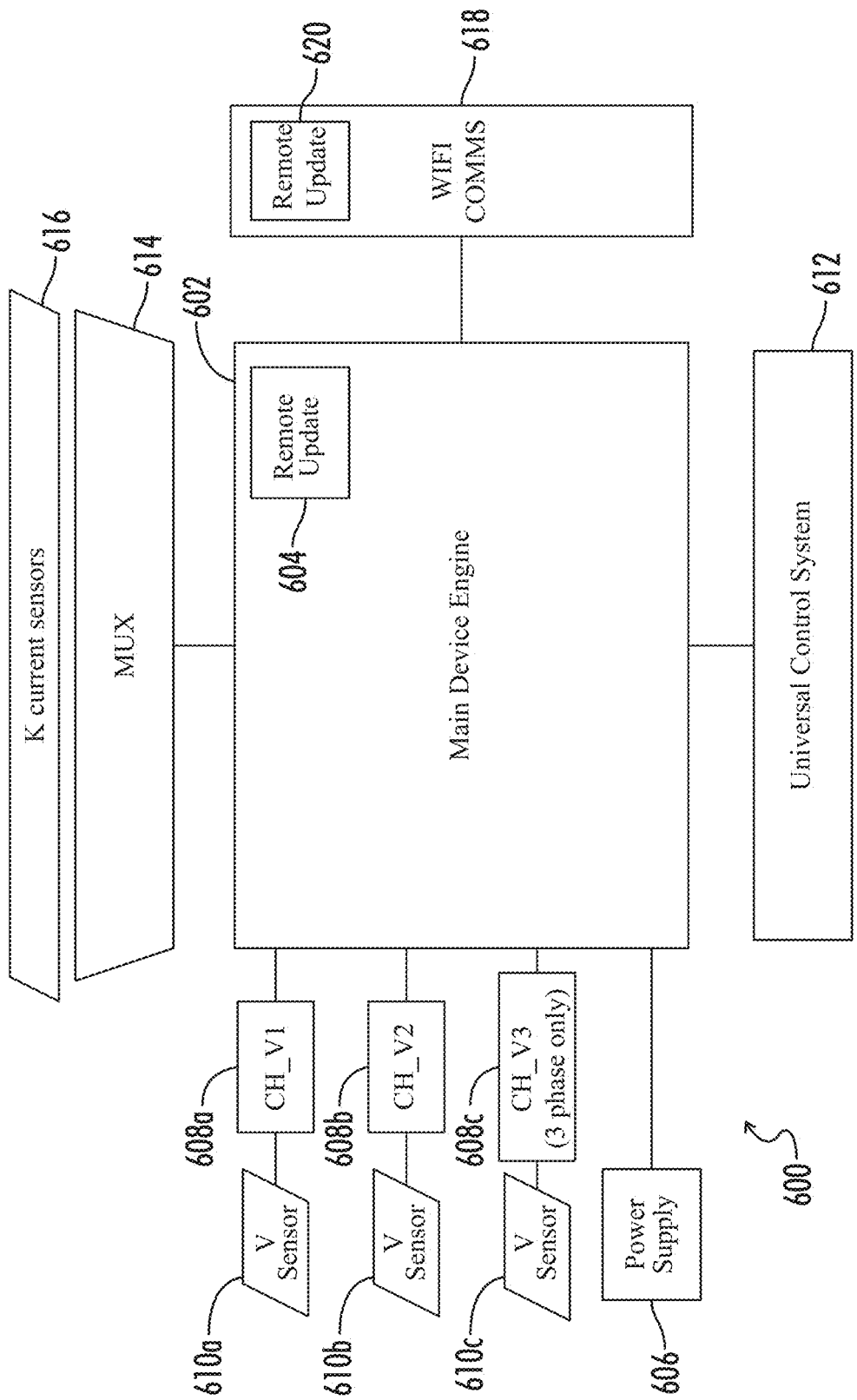
FIG. 6 illustrates a functional block diagram of a system of a Universal Embedded Metering and Control System (UEMCS) according to aspects of the present disclosure.

FIG. 6 illustrates a functional block diagram of a system 600 of a Universal Embedded Metering and Control System (UEMCS) according to aspects of the present disclosure. The system 600 includes a main device engine 602 having a remote update portion 604. The remote update portion 604 may be configured to receive and/or transmit at least one update, for example via at least one of a wired and/or wireless communication medium (such as communication module 618). The main device engine 602 may be communicatively coupled to a universal control system 612. The main device engine 602 may be further coupled to a communication module 618. The communication module 618 may include at least one of a wired and/or wireless interface to an external device or component. In one exemplary embodiment, the communication module 618 is a wireless communication module configured to send and receive information to and from an external source. The communication module 618 may include a remote update portion 620 configured to transmit and/or receive at least one set of remote update information.

The main device engine 602 may be coupled to a power supply 606. One or more voltage sensors 610a-610c may be coupled to the main device engine 602 via at least one of channels CH_V1 608a, CH_V2 608b, and/or CH_V3 608c. In one exemplary embodiment, the channel CH_V1 608a relates to a first phase, the channel CH_V2 608b relates to a second phase, and the channel CH3_V3 608c relates to a third phase. The main device engine 602 may be further coupled to a multiplexer 614. The multiplexer 614 may be configured to perform one or more multiplexing operations associated with at least one input from K current sensors 616.

Figure 7:
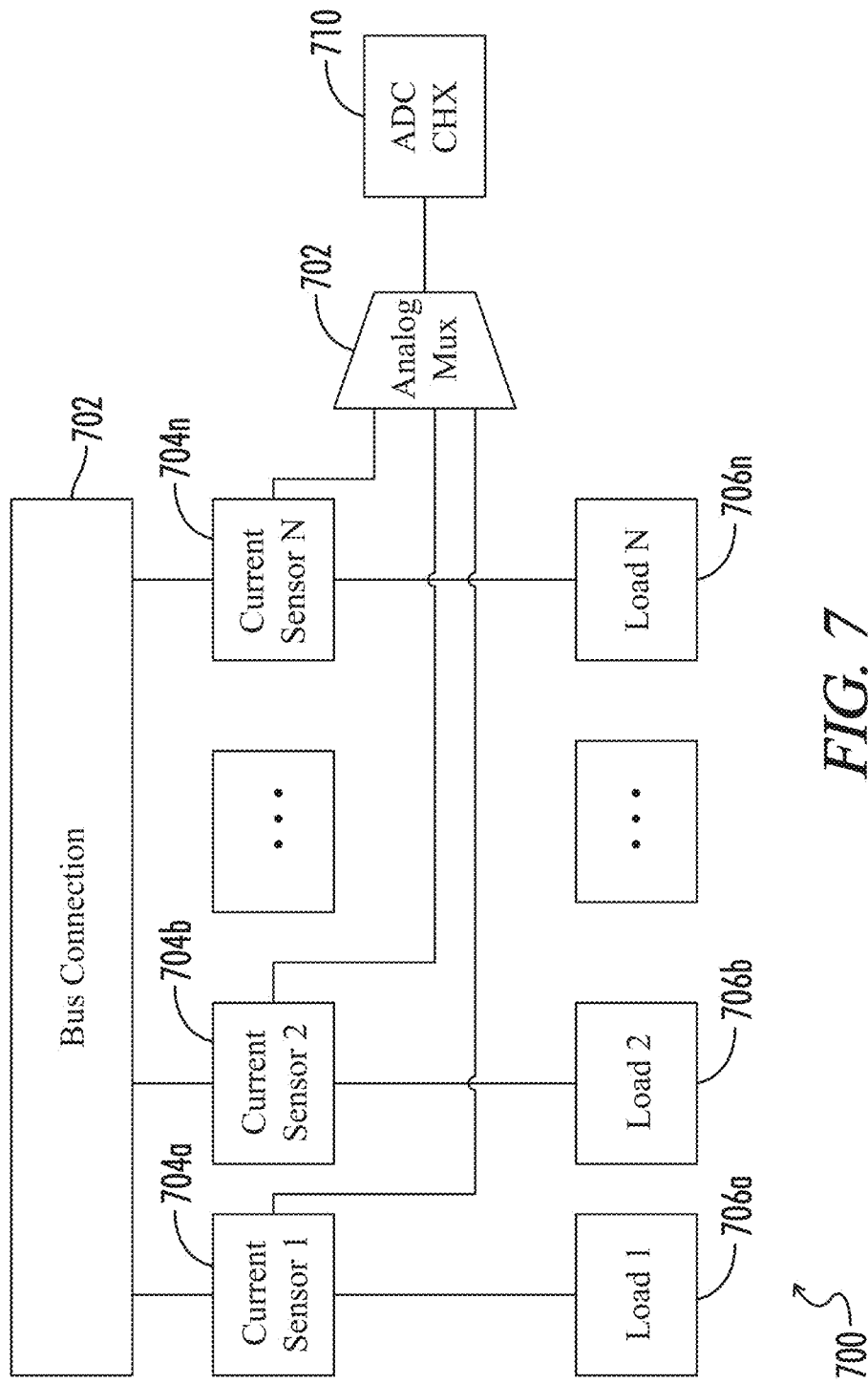
FIG. 7 illustrates a block diagram illustrating a system for providing multiplex configuration according to an aspects of the present disclosure.

The Universal Embedded Metering and Control System (UEMCS, e.g., UEMCS 312) can be separated into several functional parts as seen in FIG. 6. A WI-FI or other communication subsystem, such as communication module 618, may be used to connect to a server 140, for example to allow sending readings and receiving control orders. The voltage sensors 610a-610c and the power supply 606 may be configured to connect directly to the local power busses. A single set of voltage readings may be used for all loads in various embodiments, thereby reducing associated costs. One or more of the K current sensors 616 may be used to connect to each load, for example as illustrated by FIG. 7. To allow a large number of loads to be connected, the outputs of the K current sensors 616 may be multiplexed via the mux 614. Doing so may allow one meter to monitor multiple loads.

The Universal Control System 612 may be configured to control a number of different loads simultaneously, for example using a main processing engine. Based at least in part upon the combination of using multiplexing, executing a primary control algorithm at the server 140, and the shared use of voltage reading, the main processing engine can have low computational and memory costs. This further reduces the overall cost of the device. Also, the communication module 618 and firmware of the main device engine 602 may be updated independently. The communication module 618 may be configured to house at least a portion of configuration information and/or pages used to configure a device 110.

Figure 11:
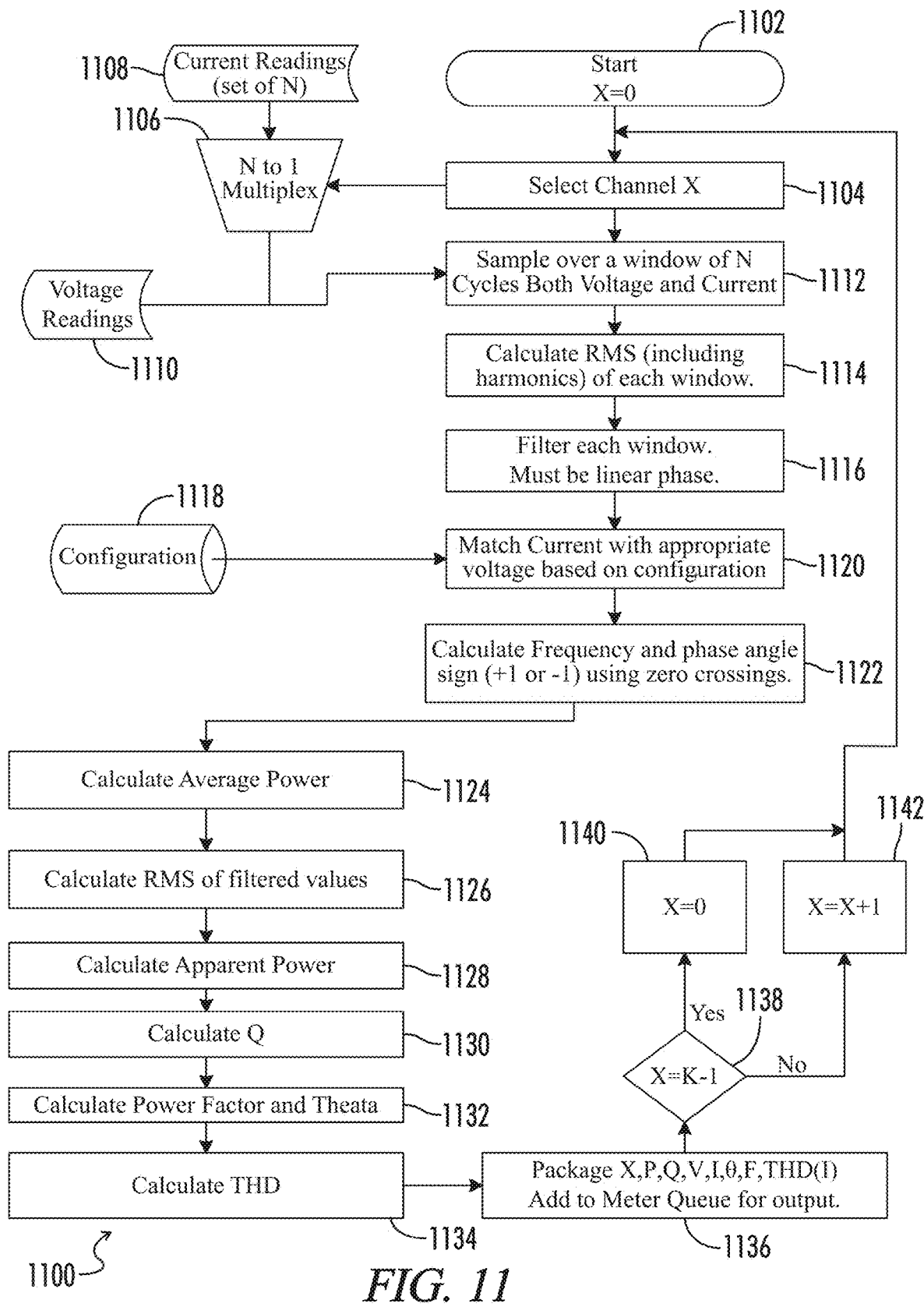
FIG. 11 illustrates a flowchart illustrating an exemplary process for calculating power statistics while using the multiplexing is illustrated by FIG. 7 according to aspects of the present disclosure.

One advantage of implementations consistent with the present disclosure is provided by the use of multiplexing. FIG. 7 illustrates a block diagram illustrating a system 700 for providing multiplex configuration according to an exemplary embodiment. As shown in FIG. 7, the multiplexing configuration allows many loads to be monitored at a time. For example, in the embodiment illustrated by FIG. 7, a first load is coupled to a bus connection 702 via a current sensor 704a, a second load is coupled to the bus connection 702 via a current sensor 704b, and a third load N is coupled to the bus connection 702 via a current sensor 704N. FIG. 11 illustrates a flowchart illustrating an exemplary process for calculating power statistics while using the multiplexing is illustrated by FIG. 7.

The process 1100 begins at a step 1102, where a value of X is set to zero. The process continues to a step 1104, where a value of channel X is selected. The value of channel X may be provided as an input received and used, at least in part, during an N to 1 multiplex operation at a step 1106. A further input to an N to 1 multiplex operation may include current readings (e.g., as a set of N values) provided at a step 1108. After selecting a value of channel X, the process continues to a step 1112, where a window of N cycles is sampled for both voltage and current. One or more voltage readings may be obtained at a step 1110. An output of the multiplex operation at step 1106 and one or more voltage readings obtained at step 1110 may be used at the step 1112 to sampled window of N cycles for both voltage and current. A root mean square (RMS) value (including harmonies) of each window may be calculated at a step 1114. Each window may be filtered at a step 1116. In one exemplary embodiment, each must be linear phase.

The process continues to a step 1118, where a configuration is obtained. The configuration used, at least in part, at a step 1120 to match a current with an appropriate voltage based upon the obtained configuration. A frequency and phase angle sign (e.g., +1 or −1) may be calculated at a step 1122 using zero crossings. An average power may then be calculated at a step 1124. An RMS value of one or more filtered values may be calculated at a step 1126, and an apparent power may be calculated at a step 1128. A Q factor (e.g., a quality or goodness value) may be calculated at a step 1130. A Power Factor and Theta value may be calculated at a step 1132. A total harmonic distortion (THD) value is optionally determined at a step 1134. One or more values of the channel X, the average power, the apparent power, the Q factor, the power factor, theta value, and/or the THD value are packaged at a step 1136 and added to the meter queue for output. At a step 1138 it is determined whether the value of the channel value X is equal to the load value K minus one. If so, the channel value X is set to zero at a step 1140, and the process returns to the step 1104. If the channel value X is not equal to the load value of K minus one, the channel value X is set to the current value of the channel X plus one at a step 1142, and the process returns to the step 1104.

In operation according to one exemplary embodiment, a power meter and control device may be configured to first select a load, then to calculate its real power, reactive power, RMS voltage, RMS current, the current load angle, frequency, and harmonic distortion. These readings are then optionally packaged and sent to the server 140, and the next load is selected. This process may be looped through all the loads as long as the power meter and control device remains on. For simplicity, both FIGS. 7 and 11 show only one analog-to-digital converter (ADC) channel used for reading current measurements. In reality, several ADC channels may be utilized to increase a maximum number of loads monitored. The multiplexers take a power meter and control device capable of monitoring K loads and increases it to a device capable of monitoring K*N loads.

Another improvement according to aspects of the present disclosure is the addition of control. Systems consistent with the present disclosure may be capable of initiating control over multiple devices and loads. This includes simple on/off control, as well as control over device set points (e.g., max power in/out, temperature, etc.). The ability to turn a load on or off may exist with every connected load, including those that support more complex methods. This may be necessary in the case of a safety action, such as an over current situation. Further, this allows a customer to choose to disable a load completely, which decreases power usage even compared to an optimized load. While not all loads would support more in-depth control, loads such as water heaters, HVAC units, and others can be controlled to a finer degree. Both water heaters and HVAC units may allow setting a temperature set point, thereby trading off comfort and cost. Another aspect is when such loads turn on and off, since the control is actuated over a larger area involving many devices, it is possible to stage the activation of large loads to reduce the overall effect in an area.

Figure 8:
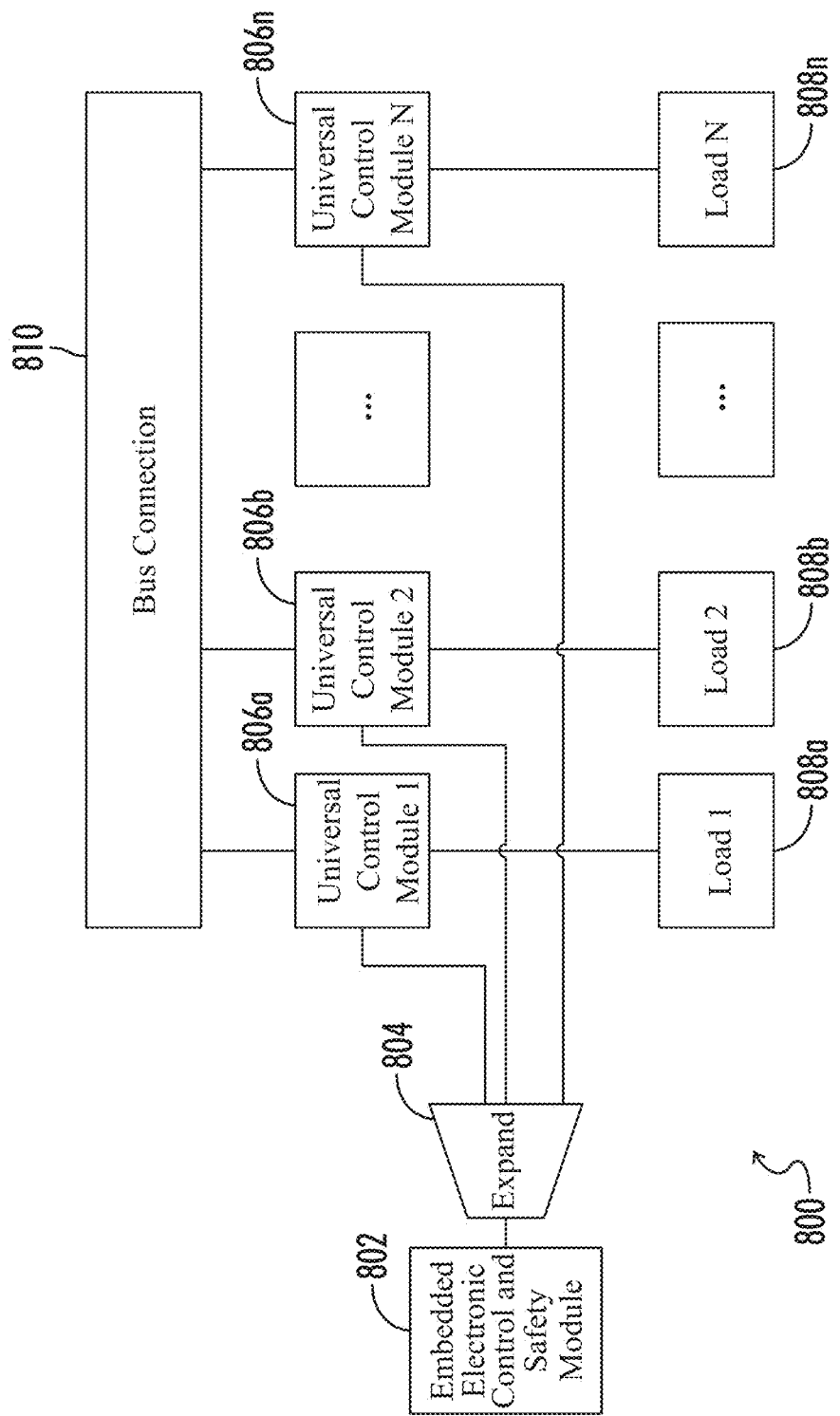
FIG. 8 illustrates a functional block diagram of a system permitting multiple loads being controlled simultaneously according to aspects of the present invention.

FIG. 8 illustrates a functional block diagram of a system 800 permitting multiple loads being controlled simultaneously. Similar to using multiplexing for reading currents, the system 800 may use different methods of expansion to allow many loads to be controlled simultaneously.

The system 800 includes a plurality of loads 808a, 808b, . . . , 808n coupled to a bus connection 810 via a plurality of universal control modules 806a, 806b, . . . , 806n. Each of the universal control modules 808a, 808b, . . . , 808n is coupled to an output of an expander 804. The expander 804 may include, for example, a demultiplexer in one exemplary embodiment. Input to the expander 804 is provided by an embedded electronic control and safety module 802. The system 800 may be configured such that a control signal is transmitted from the embedded electronic control and safety module 802 to the expander 804. The expander 804 is configured to receive the control signal from the embedded electronic control and safety module 802 and provide a corresponding output to at least one of the universal control modules 806a, 806b, . . . , 806n. At least one of the universal control modules 806a, 806b, . . . , 806n may be configured to perform one or more control operations associated with one or more of the loads 808a, 808b, . . . , 808n and/or the bus connection 810. For example, in one embodiment, the universal control module 806a is configured to control input power to the load 808a in according to the output from the expander 804 received at the universal control module 806a.

One advantageous aspect of the control system is the ability to add reactive power compensation. With reference to FIG. 8, if Load 1 through Load N are replaced with capacitors having values C1 to CN, a capacitor bank is provided. By choosing values in this pattern, another advantage is provided in the form of a simple yet effective 'Digital' capacitor bank where we can control the amount of capacitance in discrete values between C1 and CN. This may be done by grouping those N control signals, which may be on/off values, into a single group represented as an N-bit unsigned binary number in one embodiment. At least a subset of the capacitors may be configured so as not to replace loads, but rather may be added as additional controlled units. In one exemplary embodiment, there may always be at least as many loads controlled as monitored, however it might often be the case that there will be more. The capacitor bank may optionally be monitored as a single load while being controlled as N separate loads.

Figure 12:
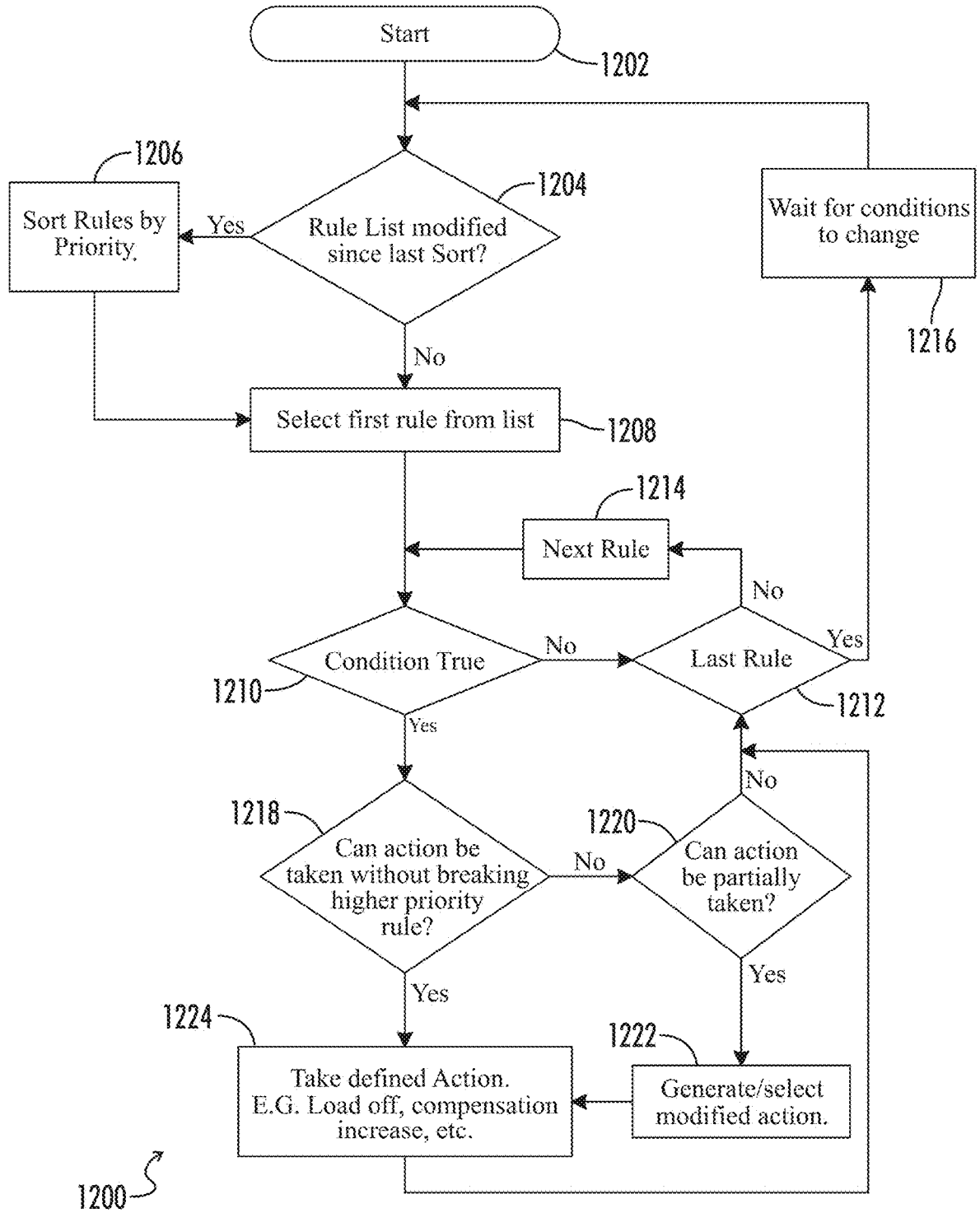
FIG. 12 illustrates a flowchart providing an exemplary control algorithm associated with a control system as described above with reference to FIGS. 7 and 8 according to aspects of the present invention.

FIG. 12 illustrates a flowchart providing an exemplary control algorithm associated with a control system as described above with reference to FIGS. 7 and 8. The process 1200 begins at a step 1202. The process continues to a step 1204, where it is determined whether a rule list has been modified since a last sort. If it is determined at the step 1204 that the rule list has not been modified since the last sort, the process continues to a step 1208, where a first rule is selected from the rule list. If it is determined that the rule list has been modified since the last sort at the step 1204, the process continues to a step 1206, where the rules are sorted by priority, and the process continues to the step 1208. The process continues from the step 1208 to a step 1210, where it is determined whether a condition corresponding to the selected first rule is true. If it is determined at the step 1210 that the condition is not true, the process continues to a step 1212, where it is determined if the selected rule was the last rule. If it is determined at the step 1212 that the selected rule was not the last rule, the process continues to a step 1214 where the next rule from the rule list is selected at the next rule, and the next rule is evaluated at the step 1210. If it is determined at the step 1212 that the selected rule is the last rule, the process continues to a step 1216 where the system waits for conditions to change. When applicable conditions have changed, the process returns to the step 1204.

If it is determined at the step 1210 that the condition is true, the process continues to a step 1218, where it is determined whether action can be taken without breaking a higher priority rule. If it is determined at the step 1218 that action cannot be taken without breaking a higher priority rule, the process continues to a step 1220, where it is determined whether action can be partially taken. If it is determined that action cannot be partially taken at the step 1220, the process returns to the step 1212. If it is determined at the step 1220 that action can be partially taken, the process continues to a step 1222, where at least one modified action is generated or selected. The process then continues to a step 1224, where a defined action is taken. The defined action may include, for example, modifying a load status or condition, providing compensation increases/decreases, etc. After taking the defined action at the step 1224, the process returns to the step 1212. If it is determined at the step 1218 that action can be taken without breaking a higher priority rule, the process continues to the step 1224 before returning to the step 1212.

Figure 9:
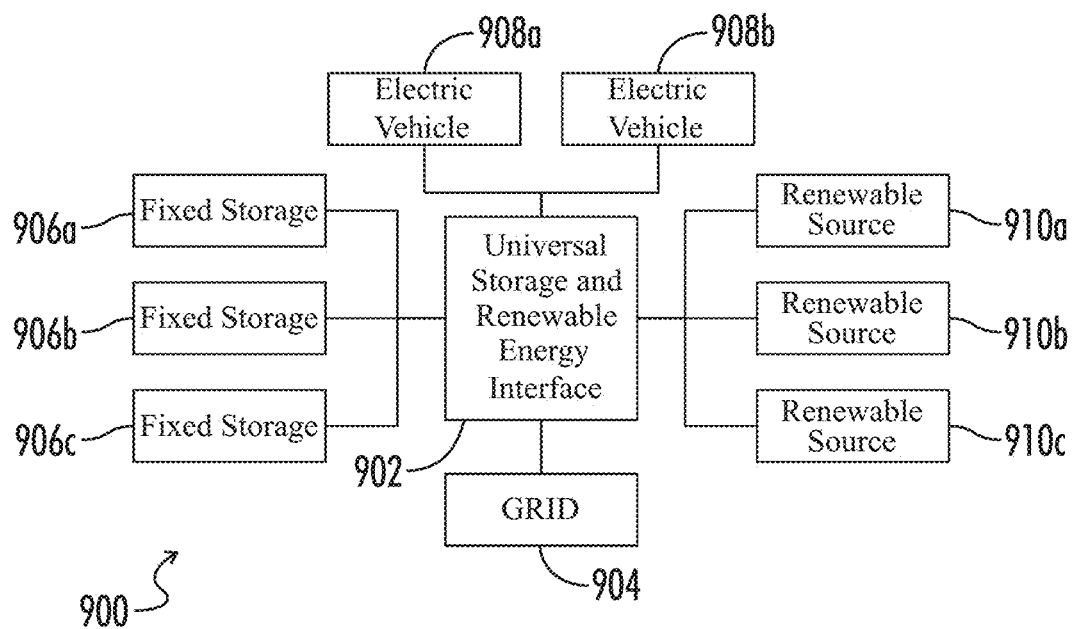
FIG. 9 illustrates a block diagram of an exemplary connection scheme for a universal storage and renewable energy interface (USREI) according to aspects of the present disclosure.

FIG. 9 illustrates a block diagram of an exemplary connection scheme for a universal storage and renewable energy interface (USREI) according to aspects of the present disclosure. The system 900 includes a USREI 902. The USREI 902 is coupled to an electrical grid 904. The USREI 902 is optionally coupled to at least one fixed storage 906a-906c. One or more electric vehicles, such as electric vehicles 908a and/or 908b may be coupled to the USREI 902. The USREI 902 may be coupled to one or more renewable energy sources, for example to one or more of renewable sources 910a-910c.

Figure 10:
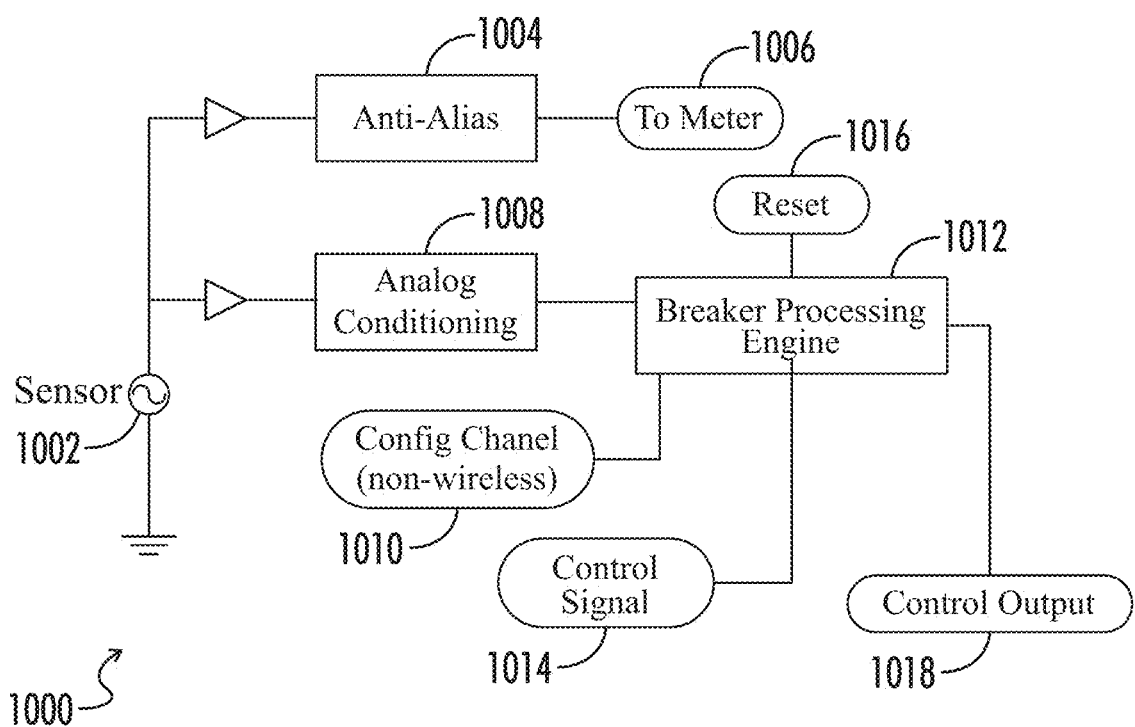
FIG. 10 illustrates an exemplary Embedded Electronic Control and Safety (EECS) module according to aspects of the present disclosure.

Yet another aspect of this device relates to operations of the Embedded Electronic Control and Safety (EECS) module, for example as illustrated by FIG. 10. The EECS module 1000 may include a voltage sensor 1002 coupled between ground and at least one of an anti-alias module 1004 and an analog conditioning module 1008. One or more circuit components may be coupled between the voltage sensor 1002 and at least one of the anti-alias module 1004 and/or analog conditioning module 1008, for example a diode and/or amplifier. The anti-alias module 1004 may be coupled to a power meter and control device at a connection 1006. The analog conditioning module 1008 may be coupled to a breaker processing engine 1012. The breaker processing engine 1012 may be further coupled to at least one of a configuration channel 1010 and a control signal 1014. A reset 1016 may be coupled to the breaker processing engine 1012 and used to reset one or more aspects of the breaker processing engine 1012. The breaker processing engine 1012 may be configured to provide a control output 1018.

Here, a local protected processing engine may be implemented by the EECS 1000 and configured to set a load control value using both the current and the past current reading along with the control signal from the main control system. If the current exceeds one or more predetermined or dynamically determined limits for the configured amount of time, the local protected processing engine of the EECS 1000 may disable the load indefinitely until a reset is detected (e.g., just like a traditional breaker, it may 'trip'). As long as the EECS module 1000 is not 'tripped,' it may initiate the control signal received from the main control system. In this way, the EECS module 1000 may act as both a control element and/or a safety element.

Another advantage of the EECS module 1000 relates to its configurability and re-configurability. An exemplary embodiment may include installing one or more EECS modules 1000 to protect a normal circuit, assuming normal loads. Here, the EECS module 100 may be configured to prevent an over current situation to prevent potential fire. However, the EECS module 1000 may also be configured to act slowly enough as to not trip when loads are first turned on and there is an associated current spike. However, a sensitive load may be installed that will not have the initial spike but that can be easily damaged by an over current situation. In this case, the EECS module 1000 can be configured to act quickly and with a lower current. Configuration of the EECS module 1000 may be performed locally in one exemplary embodiment where the EECS module 1000 does not allow remote configuration. The EECS module 1000 may be connected through a power meter itself, and thus to the Internet, in one embodiment. However, the EECS module 1000 may be configured not to be connected to a network, such as the Internet, to avoid any potential cybersecurity threat. The settings associated with the breaker processing engine 1012 may be set using physical connections and wires in an embodiment. This feature provides benefits, as a hacker turning off a load might be annoying, but a hacker turning on a faulted load can be dangerous. While today's security is better than ever, the best way to avoid being hacked is to avoid being connected at all. The risks might not worth the benefit in this case. For that reason, the EECS module(s) 1000 may not be wirelessly configurable in various embodiments. Furthermore, permitting only wired access is not less secure than non-configurable modules, as if a bad actor were to gain physical access to an EECS module 1000, they would also have physical access to the wiring thereby allowing them to bypass the EECS module 1000 altogether.

Figure 13:
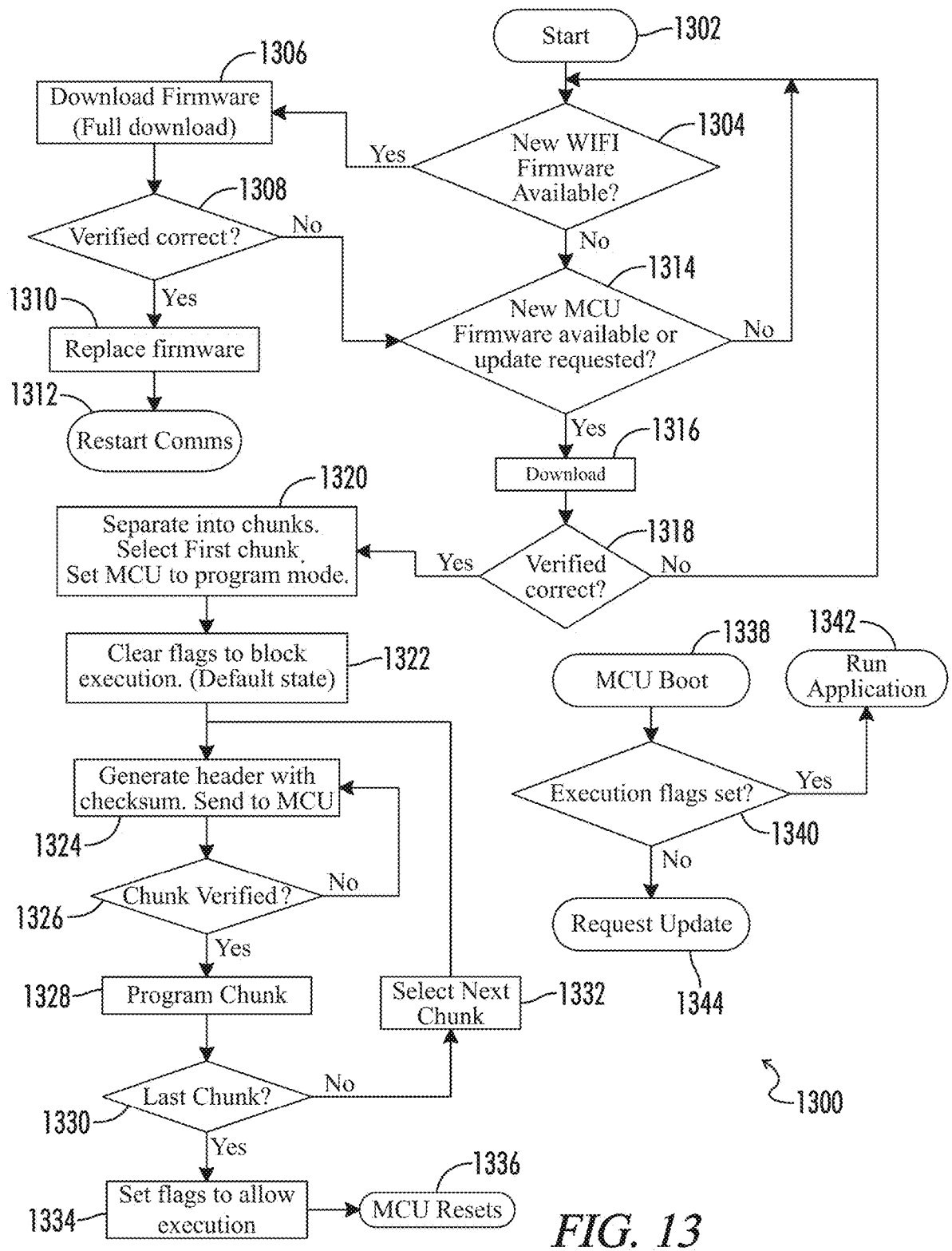
FIG. 13 illustrates a flowchart for providing an exemplary firmware update algorithm according to aspects of the present disclosure.

Another beneficial aspect of systems consistent with the present disclosure relates to the ability to automatically update both the communications firmware and the main processing firmware. FIG. 13 illustrates a flowchart for providing an exemplary firmware update algorithm according to aspects of the present disclosure.

The process 1300 begins at a step 1302. The process continues to a step 1304 where it is determined whether a new communication module firmware is available. If it is determined at the step 1304 that a new communication module firmware is available, the process continues to a step 1306 where the firmware or at least a portion thereof is downloaded from an external source. The process then continues to a step 1308, where the downloaded firmware or portion thereof is verified as being correct. If it is determined at the step 1308 that the firmware is verified as correct, the process continues to a step 1310 where the firmware is updated and/or replaced, and the process concludes at a step 1312, where the communication module is restarted. If it is determined at the step 1304 that no new communication module firmware is available, the process continues to a step 1314, where it is determined whether a new master control unit firmware is available or an update is requested. If it is determined that no new master control unit firmware is available or update is requested, the process returns to the step 1304. If it is determined at the step 1314 that a new master control unit firmware is available or an update is requested, the process continues to a step 1316, where such is downloaded. The process then continues to a step 1318 where the download is verified as correct or incorrect. If incorrect, the process returns to the step 1304.

If the download is verified correct at the step 1318, the process continues to a step 1320, where the download is separated into a plurality of chunks, the first chunk is selected, and the master control unit is set or program mode. The process then continues to a step 1322, where flags to block execution are cleared. The process then continues to a step 1324, where a header with a checksum is generated and sent to the master control unit. It is then determined at a step 1326 whether the chunk is verified. If the chunk is not verified, the process returns to the step 1324. If the chunk is verified at the step 1326, the process continues to a step 1328 where the chunk is programmed. It is determined at a step 1330 whether the current chunk is the last chunk. If it is determined that the current chunk is not the last chunk, the process proceeds to a step 1332, where a next chunk is selected and the process returns to the step 1324. If it is determined that the current chunk is the last chunk, the process continues to a step 1334, where flags are set to allow execution and the master control unit then resets at a step 1336.

The process 1300 includes a master control boot sequence beginning at a step 1338, which includes the booting of the master control unit. The process continues to a step 1340, where it is determined whether execution flags are set. If execution flags are set, the process continues to a step 1342, where an application is executed. If it is determined at the step 1340 that no execution flags are set, the process continues to a step 1344, where an update is requested.

In operation according to an exemplary embodiment, as the main device engine connects to the Internet via the communication module, a firmware update may be requested and/or performed. One result is that the communications module may be capable of directly performing self-updates. A processing engine associated with at least one of a main device engine and/or universal control system may be updated through the communication module, and may have the ability to ask for its firmware to be re-updated at any time, even if new firmware is not available. Also, when new firmware is available, the communications module may be configured to require asking a processing engine to accept the new firmware before sending it through. Implementations consistent with the present disclosure may be used to add new features, bug fixes, and may allow a customer to have a customized firmware remotely installed. Similarly, it may be possible to 'downgrade' a device using the remote update in a related matter.

Another aspect of the system is in its ability to control renewable sources and electrical storage. In one embodiment, this can be done with sources optionally connectable directly to a universal control system. In this mode, each device separately can be told how much real or reactive power to consume and/or generate. In one exemplary embodiment, an electric car may utilizes an existing network infrastructure to connect to a server to receive direct control commands.

Figure 14:
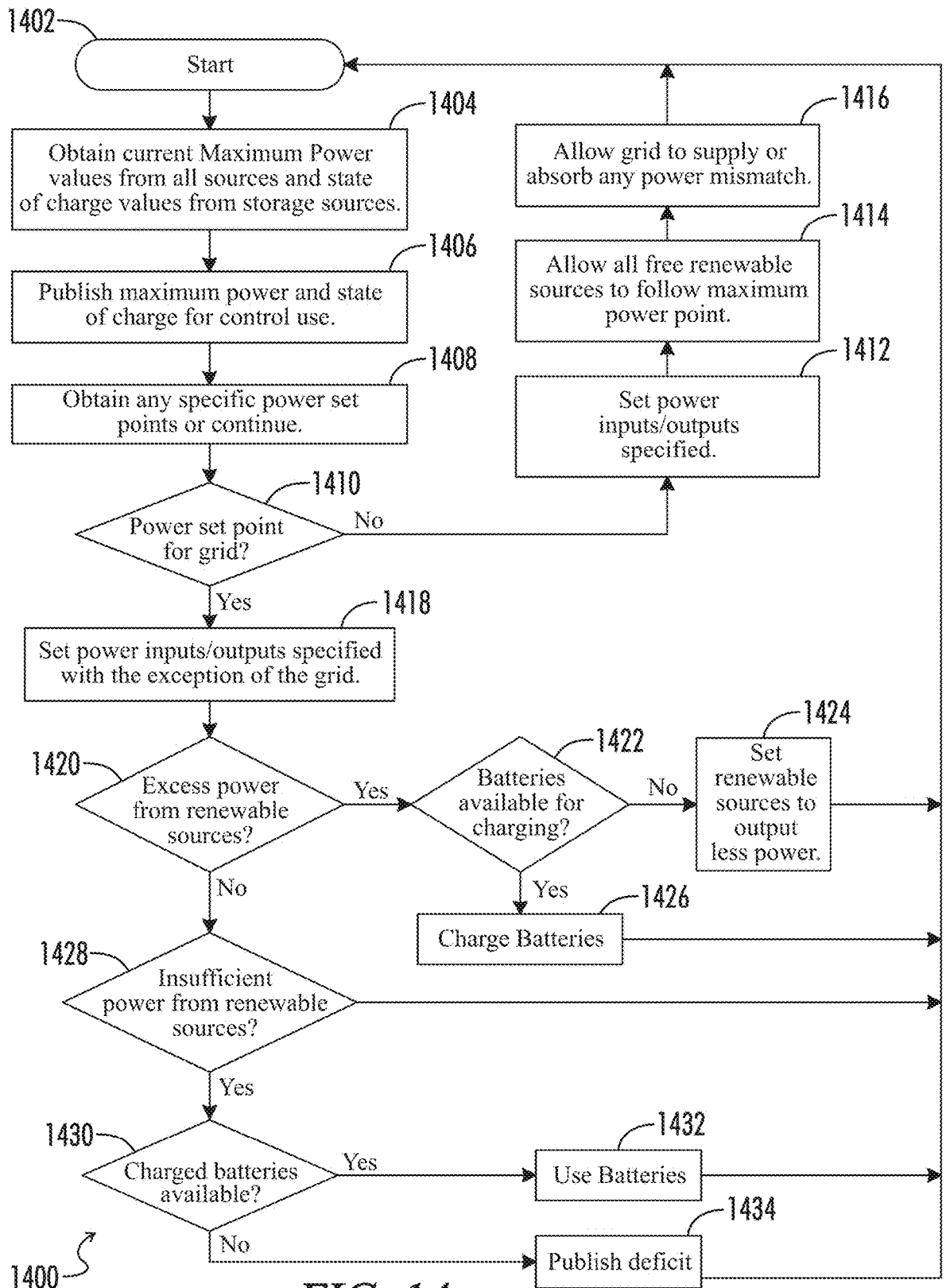
FIG. 14 illustrates a flowchart providing an exemplary algorithm for implementing operations associated with an exemplary Universal Storage and Renewable Energy Interface (USREI) according to aspects of the present disclosure.

FIG. 14 illustrates a flowchart providing an exemplary algorithm for implementing operations associated with an exemplary Universal Storage and Renewable Energy Interface (USREI) according to aspects of the present disclosure. The process 1400 begins at a step 1402. The process continues to a step 1404, where a current maximum power value is obtained from all sources and state of charge values are obtained from storage sources. The process continues to a step 1406, where the maximum power and state of charge values are published for use by a control system. At a step 1408 any specific power set points are obtained or the process otherwise continues to a step 1410. At the step 1410, it is determined whether there is a power set point for an electrical grid coupled to the USREI. If there is no power set point for the electrical grid, the process continues to a step 1412, where set power inputs and output are specified. All free renewable source are then allowed to follow the maximum power point at a step 1414. The process then continues to a step 1416, where the electrical grid is allowed to supply or absorb any power mismatch, and the process then returns to the step 1404.

If it is determined at the step 1410 that there is a power set point for the electrical grid, the process continues to a step 1418, where the set power inputs and/or outputs are set with the exception of the electrical grid. The process then continues to a step 1420, where it is determined whether excess power is received from renewable sources. If it is determined that excess power is received from renewable sources, the process continues to a step 1422, where it is determined whether batteries are available for charging. If it is determined that no batteries are available for charging, the process continues to a step 1424, where renewable sources are set to output less power and the process returns to the step 1404. If it is determined at the step 1422 that there are batteries available for charging, the process continues to a step 1426 where at least one battery is charged via the excess power from the renewable sources, and the process subsequently returns to the step 1404.

If it is determined at the step 1420 that no excess power is available from renewable sources, the process continues to a step 1428, where it is determined whether there is insufficient power from renewable sources. If it is determined that there is sufficient power from renewable sources, the process returns to the step 1404. If it is determined at the step 1428 that there is insufficient power from renewable sources, the process continues to a step 1430, where it is determined whether charged batteries are available. If it is determined that charged batteries are available, the process continues to a step 1432, where at least one charged battery is used, and the process returns to the step 1404. If it is determined that no charged batteries are available or that insufficient charged batteries are available, the process continues to a step 1434, where a deficit amount is published, and the process then returns to the step 1404.

In various exemplary embodiments, a user may configure a USREI alongside a main meter and control system. This configuration may allow all or a portion of renewable and storage systems to be controlled together. This configuration may enable charging an electric car directly from renewable sources, thereby increasing charging efficiency. Furthermore, this configuration can greatly reduce cost (e.g., in a system including two different solar arrays and three electric cars). Normally, a system including two solar arrays and three electric cars would require a five inverters, along with other necessary devices, assuming that the electric vehicles are permitted to sell back to the grid. Using the USREI, only one inverter is needed. Another advantage of implementations consistent with the present disclosure is simplified control. The main device engine may indicate to the USREI that a certain amount of power is desired. Any excess power can then go where the system wants or needs it most. Thus, the system would only require that all associated sources and storage devices be enabled to work with direct current (DC) power, which is not a hard requirement given that many of these systems are already configured to work with DC power.

The USREI may be configured to route power between any and all internally-connected points. By controlling how much power each device on the DC bus consumes or produces, an overall power consumed or produced at an inverter is controlled. Because renewable sources are not deterministic and are subject to change, the power at the inverter is not directly controlled by the universal control system. This allows the grid power to change if necessary, while the system works to route needed power from another source, such as a battery or another renewable source that is operating below its maximum power. When using the USREI, the main inverter itself may be utilized to generate or to consume reactive power in addition to locally-operated banks One advantage to this implementation is a finer-grained control, while a disadvantage relates to a drop in inverter efficiency.

Another beneficial aspect of the implementations consistent with the present disclosure relates to the potential ability to cooperate other independent systems. Take the system in patent application publication US20100274656A1 as an example. The purpose of the system described is to authenticate and sell energy to electric vehicles. This system is stated to be able to be implemented in programming, so it is possible that this system runs on a connected server where it deals with all of the details relating to the sell, while utilizing an implementation consistent with the present disclosure to control an amount of power flowing into each electric vehicle.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An apparatus for providing load disaggregation, remote monitoring, and controlling a plurality of loads, the apparatus comprising:
    a universal embedded metering and control system (UEMCS) including,
        a main device engine;
        a communication module coupled to the main device engine;
        a plurality of current sensors;
        a multiplexer coupled between the plurality of current sensors and the main device engine, the multiplexer configured to receive a current sensor value from each of the current sensors and to provide a multiplexed current sensor output; and
        at least one voltage sensor coupled to the main device engine, the at least one voltage sensor having a channel associated with the main device engine, the channel associated with a current value of at least one of the plurality of current sensors included in the multiplexed current sensor output; and
    a universal storage and renewable energy interface (USREI) coupled to at least one of the plurality of current sensors, the USREI configured to be coupleable to at least one renewable energy source and configured to provide energy output by the at least one renewable energy source to the UEMCS for output to at least one of the plurality of loads.

2. The apparatus of claim 1, wherein each of the plurality of current sensors is configured to correspond to a particular load of a plurality of loads coupled to the apparatus.

3. The apparatus of claim 1, wherein the UEMCS is configured to receive operation information from the plurality of current sensors and from the at least one voltage sensor, and to perform a load control operation by the main device engine based on the received operation information.

4. The apparatus of claim 1, wherein the main device engine is configured to compare a measured energy output of the at least one renewable energy source to a power set point and to perform a renewable energy source operation according to the comparison.

5. The apparatus of claim 4, wherein the renewable energy source operation comprises at least one of increasing or decreasing energy output by the at least one renewable energy source.

6. The apparatus of claim 4, wherein the renewable energy source operation comprises publishing a renewable energy source deficiency notification.

7. The apparatus of claim 1, wherein the communication module is configured to communicate with a device external to the UEMCS and to receive at least one set of firmware data from the device external to the UEMCS.

8. The apparatus of claim 7, wherein the at least one set of firmware data contains firmware update data associated with at least one of the main device engine and the communication module, and wherein the at least a portion of the at least one set of firmware data contains an updated firmware.

9. The apparatus of claim 7, wherein the at least one set of firmware data contains firmware update data associated with at least one of the main device engine and the communication module, and wherein the at least a portion of the at least one set of firmware data contains a downgraded firmware.

10. The apparatus of claim 1, wherein the main device engine is configured to cause at least a portion of energy generated by the at least one renewable energy source to be transmitted to a power grid coupled to the apparatus.

11. A power distribution apparatus, comprising:
- a conductive bus coupleable to a power grid;
- a power meter and control device coupled to the conductive bus;
- a voltage sensor coupled between the conductive bus and the power meter and control device, the voltage sensor associated with an input channel;
- a plurality of current sensors coupled to the conductive bus;
- a multiplexer coupled to the plurality of current sensors, the multiplexer configured to receive a current sensor value from each of the plurality of current sensors and to provide a multiplexed current sensor output wherein the input channel is configured to be associated with a current value of at least one of the plurality of current sensors included in the multiplexed current sensor output;
- at least one universal control and safety module coupled to at least one of the plurality of current sensors and coupleable to a load of the power distribution apparatus; and
- a universal storage and renewable energy interface coupled to at least one of the plurality of current sensors and further connected to at least one renewable energy source.

12. The power distribution apparatus of claim 11, wherein the power distribution apparatus is configured to be coupleable to an existing power distribution panel.

13. The power distribution apparatus of claim 11, wherein the power distribution apparatus includes a breaker processing engine configured to receive a control signal and to perform at least one circuit breaking operation responsive to the control signal, wherein the power distribution apparatus is configured to operate as a replacement to an existing power distribution panel.

\* \* \* \* \*